United States Patent [19]

Han

[11] Patent Number: 5,635,221
[45] Date of Patent: Jun. 3, 1997

[54] INJECTION MOLDING APPARATUS FOR RESIN USING GAS INJECTION

[75] Inventor: Jin H. Han, Kyungki-do, Rep. of Korea

[73] Assignee: LG Electronics Inc., Seoul, Rep. of Korea

[21] Appl. No.: 415,049

[22] Filed: Mar. 31, 1995

[30] Foreign Application Priority Data

Apr. 9, 1994 [KR] Rep. of Korea ............... 7476/1994

[51] Int. Cl.⁶ .................................................. B29C 45/13
[52] U.S. Cl. ................ 425/132; 264/328.8; 264/572; 425/387.1; 425/546; 425/573; 425/574
[58] Field of Search ........................... 425/546, 569, 425/573, 387.1, 533, 132, 574; 264/572, 328.8, 328.11

[56] References Cited

U.S. PATENT DOCUMENTS

| | | | |
|---|---|---|---|
| 2,940,123 | 6/1960 | Beck et al. | 425/546 X |
| 3,162,703 | 12/1964 | Eyles | 425/546 X |
| 4,412,804 | 11/1983 | Huther | 425/546 |
| 4,923,667 | 5/1990 | Sayer | 264/572 |
| 4,935,191 | 6/1990 | Baxi | 264/572 |
| 5,015,166 | 5/1991 | Baxi | 264/572 X |
| 5,162,122 | 11/1992 | Loren | 425/573 X |
| 5,169,648 | 12/1992 | Eckardt et al. | 264/572 X |
| 5,173,241 | 12/1992 | Shibuya et al. | 264/328.8 X |
| 5,240,399 | 8/1993 | Baxi et al. | 264/572 X |
| 5,374,181 | 12/1994 | Horikoshi et al. | 425/546 |

FOREIGN PATENT DOCUMENTS 2-72917   3/1990   Japan .................................. 425/546

*Primary Examiner*—Richard L. Chiesa
*Attorney, Agent, or Firm*—Fish & Richardson P.C.

[57] ABSTRACT

An injection molding apparatus for a resin structure uses gas injection. The apparatus includes a resin supply that feeds more than one resin to a mold, a gas exhaust that discharges gas supplied to the resin in order to closely contact the resin to the mold, and a supply selector that selectively opens and closes the resin supply using the pressure of the discharged gas to supply a different kind of resin onto the inner surface of a previously supplied resin.

4 Claims, 2 Drawing Sheets

INJECTION MOLDING APPARATUS FOR RESIN USING GAS INJECTION

BACKGROUND OF THE INVENTION

The present invention relates to a gas injection molding apparatus and method, and more particularly, to a resin injection molding apparatus and method in which gas injected into a first-formed product is exhausted to add a different resin in gas injection molding.

In general, the injection molding is one of the plastic molding methods. A gas injection molding technique was invented in the United Kingdom. This gas injection molding involves a molding technique where gas is injected simultaneously when resin is put into a mold to form the shape of the resin in a hollow, reducing the material and the molding pressure of an injection molding apparatus.

A conventional injection molding apparatus, as shown in FIG. 1, comprises a mold 1 for manufacturing a resin product 3, an injection path 4 for providing resin and gas into a hollow 2 formed inside mold 1, an injector 5 for compressing the resin to injection path 4, and a gas supply 6 for feeding gas to injection path 4.

Injector 5 includes a nozzle 7 on the border of injection path 4. Gas supply 6 has a gas intake 8 on the border of injection path 4.

The operation of the conventional gas injection molding apparatus will be discussed below.

As resin is filled in injection path 4 and product 3 through nozzle 7 by 70–80% of the volume of the product, nozzle 7 of injector 5 is closed. Gas then comes into injection path 4 via gas intake 8.

The gas enters the center portion of product 3. The resin filled in hollow 2 is dispersed uniformly in hollow 2 under the pressure of the gas. The center portion of hollow 2 is continuously filled with the gas.

The cross section of the product formed by the conventional gas injection molding is shown in FIG. 2.

In the conventional gas injection molding apparatus, however, there sometimes occurs a case in which the gas is exposed on the surface of the hollow, deteriorating the exterior of the product.

In addition, the conventional gas injection molding apparatus is not capable of re-enforcing the stiffness of resin good in roughness but fragile in stiffness.

SUMMARY OF THE INVENTION

Therefore, it is an object of the present invention to provide an injection molding apparatus and method which forms a product of resin of good roughness (smooth) on the outer surface, and forms a product of resin of good stiffness in the center portion, thereby re-enforcing the stiffness of resin with a smooth outer surface.

To accomplish the object of the present invention, there is provided an injection molding apparatus for a resin structure using gas injection comprising: resin supplying means for feeding more than one resin to a mold; gas exhausting means for discharging gas supplied to resin in order to closely contact the resin to the mold; and selective supply means for selectively opening/closing the resin supply means by the pressure of the discharged gas to supply a different kind of resin onto the inner surface of a previously located resin.

The gas exhausting means comprises: an eject pin for opening a path when gas fills a hollow of the previously located resin and the pressure of the hollow is raised, or for closing the path when the pressure of the hollow is lowered; a gas discharging pipe for guiding gas exhausted by the eject pin; and resilience means for providing a resilience force to the eject pin.

The selective supply means comprises: resin outlets formed on the resin supply means for discharging resin; a nozzle moving up and down by the pressure of gas coming from the gas exhausting means to be connected to one of the resin outlets, and for giving the resin coming into the connected resin outlet to the path; and resilience means for providing a resilience force to the nozzle.

DETAILED DESCRIPTION OF THE PREFERRED EMBODIMENT

Hereinafter, a preferred embodiment of the present invention will be described below with reference to the attached drawings.

Figure 1:
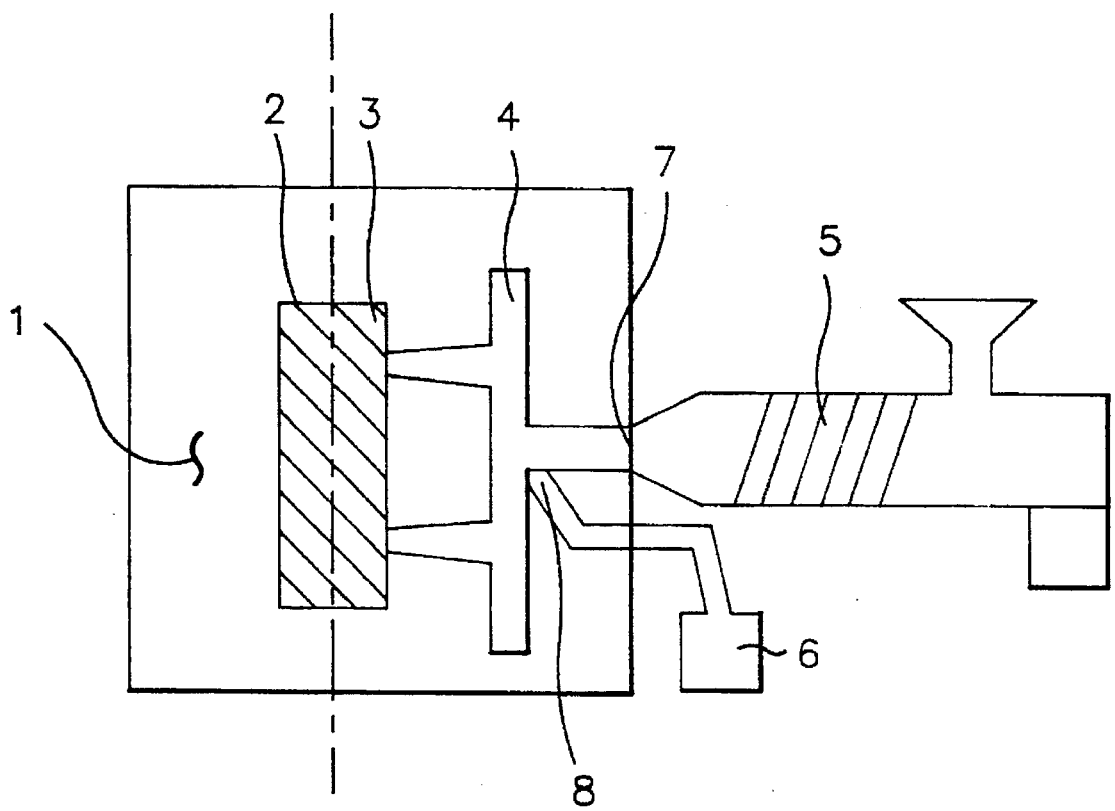
FIG. 1 illustrates the configuration of a conventional gas injection molding apparatus.
Figure 2:
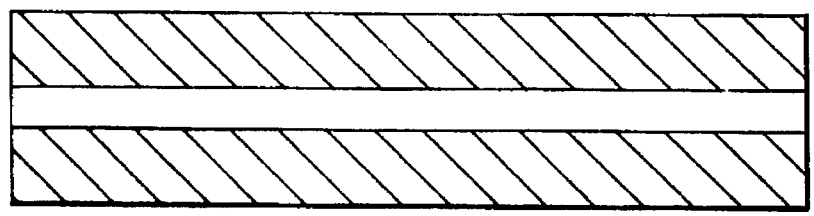
FIG. 2 is a cross-sectional view of a product manufactured by the conventional technique.
Figure 3:
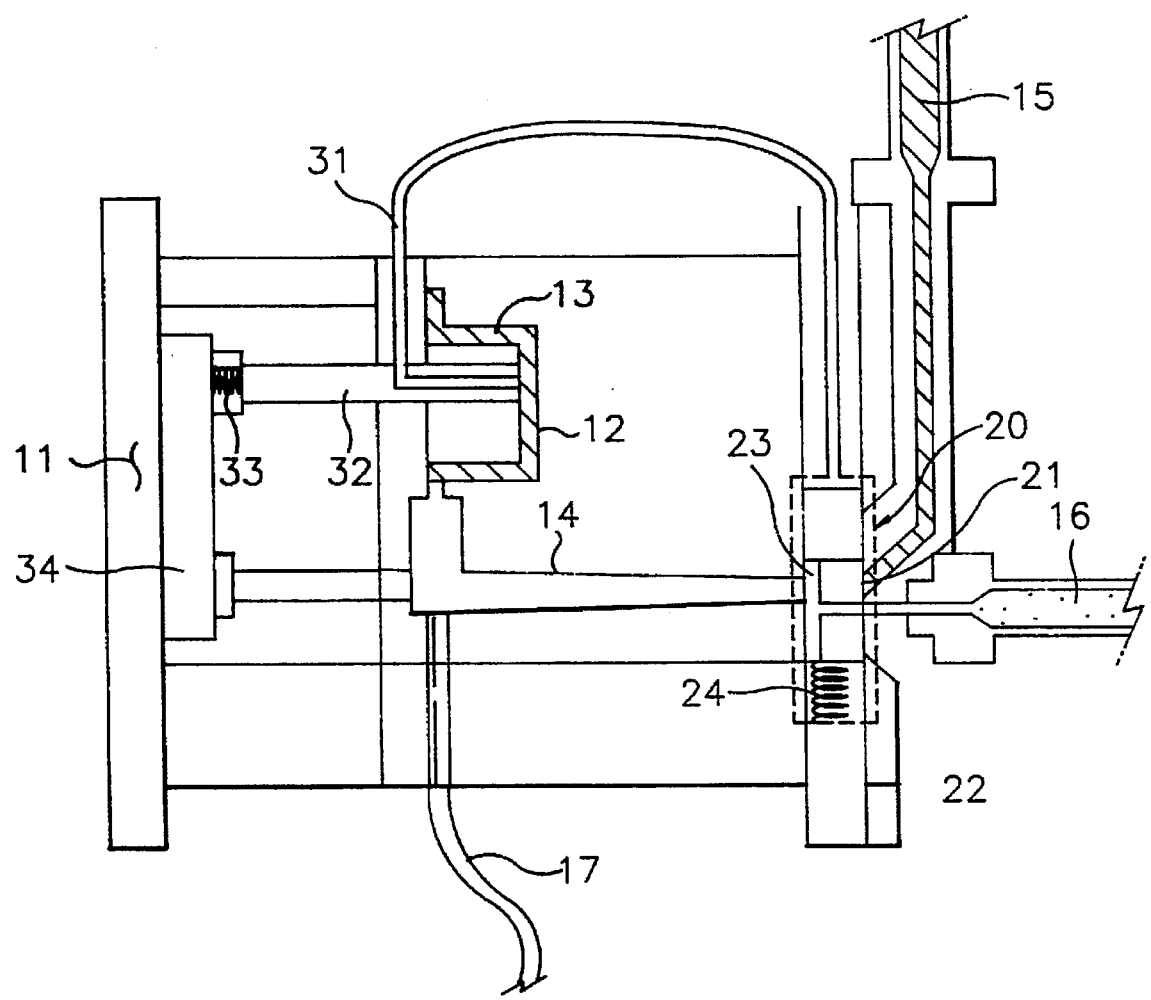
FIG. 3 is a configuration diagram of an injection molding apparatus for a different-resin product using a gas injection according to the present invention.

As shown in FIG. 3, an injection molding apparatus for the different-resin product of the present invention comprises a mold for forming the shape of a product 13, an injection path 14 for injecting resin into mold 11, first and second injectors 15 and 16 for supplying first and second resins to injection path 14, a gas intake 17 connected to injection path 14 in order to put gas into the resin when it fills mold 11 by 70–80%, a gas exhausting portion (31, 32, 33 and 34) for exhausting the gas when the gas of the mold coming via gas intake 17 reaches a predetermined pressure, and nozzle shifting device 20 for selectively coupling one of first and second injectors 15 and 16 to the injection path under the pressure of the gas discharged from the gas exhausting portion (31, 32, 33 and 34) so as to supply only one kind of resin to injection path 14 at one time.

The gas exhausting portion (31, 32, 33 and 34) is made up of an eject pin 32 for opening a path when the gas is filled in the hollow of the resin and the pressure of the hollow is raised, or closing the path when the pressure of the hollow is lowered, a gas discharging pipe 31 for guiding the gas exhausted by eject pin 32, a spring 33 for giving a resilience force to the eject pin, and an eject plate 34 for supporting spring 33.

Nozzle shifting device 20 comprises resin outlets 21 and 22 provided to injectors 15 and 16 for discharging the resin, a nozzle 23 for moving up and down by the pressure of the gas coming into the gas exhausting portion (31, 32, 33 and 34) to be connected to one of resin outlets 21 and 22, and for giving the resin coming via the connected resin outlet to injection path 14, and a spring 24 for giving a resilience force to the nozzle.

The operation of the injection molding apparatus for a different-resin product of the present invention will be explained below.

When resin enters injection path 14 and hollow 12 from first injector 15 and fills 70–80% of hollow 12, gas is injected through gas intake 17. Due to the pressure of the gas, the resin filling the hollow 12 is uniformly dispersed on the inner surface of hollow 12. The center portion of hollow 12 is filled with the gas.

The gas exhausting portion (31, 32, 33 and 34) discharges the gas coming into hollow 12 to nozzle shifting device 20. Eject pin 32 of the gas exhausting portion (31, 32, 33 and 34) moves left and right by the pressure of the gas present inside hollow 12. Specifically, as hollow 12 is filled with the gas and the internal pressure of hollow 12 is raised, a force is applied to spring 33 attached to the end of eject pin 32 so that eject pin 32 moves left to open the path. When the path is opened, the gas of hollow 12 is discharged to nozzle shifting device 20 through gas discharging pipe 31.

As the gas is exhausted to nozzle shifting device 20, the pressure of hollow 12 is lowered and therefore eject pin 32 moves right to close the path. The gas entering nozzle shifting device 20 from gas discharging pipe 31 applies a pressure to nozzle 23. Nozzle 23 moves from first resin outlet 21 to second resin outlet 22. According to this operation, hollow 12 is filled with a second resin contained in second injector 16. When the filling is finished, mold 11 is opened.

Figure 4:
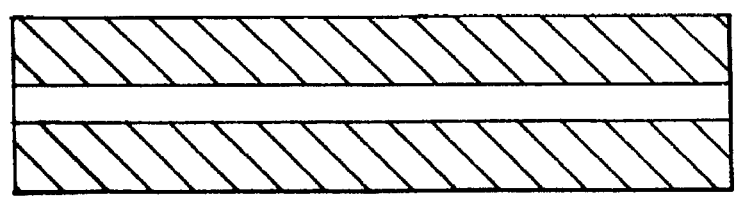
FIG. 4 is a cross-sectional view of a product made by the present invention.

As mold 11 is opened, the gas of the gas outlet and nozzle shifting device 20 is discharged, and nozzle 23 returns to the original position by the resilience of spring 24. A product made by the injection molding apparatus and method using gas injection of the present invention is shown in FIG. 4.

In the injection molding apparatus and method for different-type resin using gas injection of the present invention, a different resin can be injected into the center of a product which is hollow by the injection of gas so that resin of good roughness is given to the outer surface, resin of good stiffness to the center. This re-enforces the stiffness of resin of good roughness.

Further, according to the present invention, when the gas of the hollow is raised above a predetermined pressure, the raised pressure is taken out in order to prevent the gas from being exposed to the exterior of the product.

What is claimed is:

1. An injection molding apparatus for a resin structure using gas injection comprising:

resin supplying means for feeding more than one resin to a mold;

gas exhausting means for discharging gas supplied to resin in order to closely contact said resin to said mold; and selective supply means for selectively opening/closing said resin supplying means by the pressure of the discharged gas to supply a different kind of resin onto the inner surface of a previously located resin.

2. An injection molding apparatus for a resin structure using gas injection as claimed in claim 1, wherein said gas exhausting means comprises:

an eject pin for opening a path when gas is filled in a hollow of said previously located resin and the pressure of the hollow is raised, or for closing said path when the pressure of said hollow is lowered;

a gas discharging pipe for guiding gas exhausted by said eject pin; and resilience means for providing a resilience force to said eject pin.

3. An injection molding apparatus for a resin structure using gas injection as claimed in claim 1, wherein said selective supply means comprises:

resin outlets formed on said resin supplying means for discharging resin;

a nozzle moving up and down by the pressure of gas coming from said gas exhausting means to be connected to one of said resin outlets to form a path, and for passing the resin coming into said connected resin outlet to said path; and resilience means for providing a resilience force to said nozzle.

4. An injection molding apparatus for a resin structure using gas injection as claimed in claim 1, wherein said resin supplying means feeds two different kinds of resin, the first resin being of good roughness and the second resin being of good stiffness, wherein the second resin is injected into a product made of the first resin.

* * * * *